(12) United States Patent
Wu et al.

(10) Patent No.: US 7,979,171 B2
(45) Date of Patent: Jul. 12, 2011

(54) PERMANENT MAGNET TEMPERATURE ESTIMATION

(75) Inventors: Ji Wu, Dearborn, MI (US); Franco Leonardi, Dearborn Heights, MI (US); Feng Liang, Troy, MI (US); Michael W. Degner, Novi, MI (US); Daniel Luedtke, Berkley, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 12/887,117

(22) Filed: Sep. 21, 2010

(65) Prior Publication Data

US 2011/0144843 A1 Jun. 16, 2011

(51) Int. Cl.
*B60L 15/00* (2006.01)

(52) U.S. Cl. ............................................ 701/22; 701/31

(58) Field of Classification Search ............... 701/22, 701/36, 29, 31; 318/712, 717, 719, 723, 318/799, 807, 812, 815
See application file for complete search history.

(56) References Cited

U.S. PATENT DOCUMENTS

| 6,064,172 | A  | * | 5/2000 | Kuznetsov | ............... | 318/716 |
| 7,193,383 | B2 | * | 3/2007 | Sarlioglu et al. | ............... | 318/438 |
| 7,586,286 | B2 | * | 9/2009 | Cheng et al. | ............... | 318/807 |

* cited by examiner

*Primary Examiner* — Richard M. Camby
(74) *Attorney, Agent, or Firm* — David B. Kelley; Brooks Kushman P.C.

(57) ABSTRACT

A method of controlling a vehicle including a permanent magnet (PM) synchronous motor is provided. The motor is controlled based on direct-axis (d-axis) and quadrature-axis (q-axis) current commands. The method includes estimating permanent magnet flux linkage based on q-axis voltage and electrical angular speed, and estimating permanent magnet temperature based on permanent magnet flux linkage and the temperature coefficient of the permanent magnet. The vehicle is controlled based on the estimated permanent magnet temperature.

17 Claims, 3 Drawing Sheets

PERMANENT MAGNET TEMPERATURE ESTIMATION

BACKGROUND

1. Technical Field

The invention relates to magnet temperature estimation for permanent magnet (PM) electric machines based on magnetic flux linkage. The invention further relates to hybrid electric vehicles that use permanent magnet (PM) motors.

2. Background Art

The use of permanent magnet (PM) synchronous motors has become widespread. In general, a PM synchronous motor includes a rotor having permanent magnets mounted on the rotor periphery or buried inside the rotor.

It is difficult to measure the temperature of magnets buried deep in the rotor of an electric machine. An infrared sensor can only sense the temperature of the rotor surface but magnet temperature can get much higher than surface temperature. Inductive heating to the magnets and air conduction at the surface can significantly increase the difference between magnet temperature and rotor surface temperature. A wireless sensor could be used for large industry motors but a wireless sensor is not cost effective on applications such as hybrid electric vehicles.

For the foregoing reasons, there is a need for a method of estimating magnet temperature for permanent magnet (PM) electric machines.

SUMMARY

It is an object of the invention to provide an improved approach to magnet temperature estimation for permanent magnet (PM) electric machines based on magnetic flux linkage.

In one embodiment, a method of controlling a vehicle including a permanent magnet (PM) synchronous motor is provided. The motor is controlled based on direct-axis (d-axis) and quadrature-axis (q-axis) current commands. The method comprises estimating permanent magnet flux linkage based on q-axis voltage and electrical angular speed. The method further comprises estimating permanent magnet temperature based on permanent magnet flux linkage and the temperature coefficient of the permanent magnet. The method further comprises controlling the vehicle based on the estimated permanent magnet temperature.

At the more detailed level, the invention contemplates various additional features that may be included individually or in appropriate combinations in any embodiments of the invention. For example, the permanent magnet flux linkage may be estimated in accordance with $$Vq = Iq*Rs + (Ö(T) + Id*Ld)*w$$

wherein Ö(T) is permanent magnet flux linkage, Vq is q-axis voltage, Iq is q-axis current, Rs is stator resistance, Id is d-axis current, Ld is d-axis inductance, and w is electrical angular speed. Preferably, Ld is obtained by testing which includes commanding only Id current steps from zero to negative until Vq reaches zero, and approximating a slope of Vq/w−Id curve.

The permanent magnet temperature may be estimated in accordance with $$Ö(T) = Ö(0° C.)*(1 + T*K\_temp)$$

wherein T is permanent magnet temperature, Ö(0° C.) is baseline flux linkage at 0° C., K_temp is the temperature coefficient of the permanent magnet in units of 1/° C.

And more particularly, the permanent magnet temperature may be estimated in accordance with $$T = (-1 + (Vq/w - Id*Ld)/Ö(0° C.))/K\_temp$$

wherein T is permanent magnet temperature, Vq is q-axis voltage, Id is d-axis current, Ld is d-axis inductance, w is electrical angular speed, Ö(0° C.) is baseline flux linkage at 0° C., and K_temp is the temperature coefficient of the permanent magnet in units of 1/° C.

Controlling the vehicle may include one or more actions that are directed or affected by the estimated permanent magnet temperature. For example, controlling the vehicle may include generating an output signal indicative of the estimated permanent magnet temperature. For example, the vehicle may include a memory, and controlling the vehicle comprises storing a diagnostic code in the memory.

It is appreciated that embodiments of the invention are particularly useful in hybrid electric vehicles that use permanent magnet (PM) motors. In addition, embodiments of the invention may be implemented in other applications, such as motor test dynamometers, or other permanent magnet electric machines that use vector control. Advantageously, embodiments of the invention may give the inside temperature of permanent magnets instead of surface temperature at the rotor end cap.

In an additional embodiment of the invention, a method of controlling a permanent magnet (PM) synchronous motor is provided. The motor is controlled based on direct-axis (d-axis) and quadrature-axis (q-axis) current commands. The method comprises estimating permanent magnet flux linkage based on q-axis voltage and electrical angular speed, and estimating permanent magnet temperature based on permanent magnet flux linkage and the temperature coefficient of the permanent magnet. The method further comprises generating an output signal indicative of the estimated permanent magnet temperature.

In yet another embodiment of the invention, an apparatus for controlling a permanent magnet (PM) synchronous motor comprises a motor controller configured to control the motor based on direct-axis (d-axis) and quadrature-axis (q-axis) current commands. The motor controller is further configured to estimate permanent magnet flux linkage based on q-axis voltage and electrical angular speed; estimate permanent magnet temperature based on permanent magnet flux linkage and the temperature coefficient of the permanent magnet; and generate an output signal indicative of the estimated permanent magnet temperature.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The invention comprehends various aspects of magnet temperature estimation for permanent magnet electric machines based on magnetic flux linkage. Examples are described in further detail below.

In one particular embodiment, the linear relation between magnetic flux linkage and temperature in a certain operating range is used to back calculate magnet temperature by estimating magnetic flux linkage using the intrinsic electric machine equation. In more detail, magnetic flux linkage at temperature T can be represented by:

$$\ddot{O}(T)=\ddot{O}(0°\,C.)*(1+T*K\_temp) \quad (1)$$

in which Ö(0° C.) is baseline flux linkage at 0° C., K_temp is the temperature coefficient of the magnet in units of 1/° C., the value depends on the material of magnets. A typical value for a NdFeB permanent magnet is −0.1%. To estimate flux linkage, the intrinsic equation:

$$Vq=Iq*Rs+(\ddot{O}(T)+Id*Ld)*w \quad (2)$$

in which Vq, Iq are the voltage and current components applied to the (quadrature axis or q-axis of the motor) direction 90 degrees from permanent magnet flux linkage, Rs is stator resistance, Id is the current component applied to the same direction as permanent magnet flux linkage (direct axis or d-axis of the motor), Ld is d-axis inductance and w is electrical angular speed.

In a preferred approach, the Ld value is obtained by testing rather than using a value calculated from analysis such as finite element analysis. To get Ld in this approach, Id current steps are commanded from zero to negative until Vq reaches zero. A plot is made with Id as x-axis and Vq/w as y-axis. The slope of Vq/w−Id curve is Ld. To get an accurate estimation of Ö(T), it is preferred to have zero Iq current so that term Iq*Rs can be eliminated. More specifically, for a practical implementation of the method, the torque command should be zero. If torque is not zero, Iq is not zero, and Rs has to be estimated when Iq is non-zero, which may be difficult to do accurately. Accordingly, Rs can be estimated, but is preferred to get the estimation of Ö(T) when there is zero torque. From (1) and (2), it is possible to calculate temperature:

$$T=(-1+\ddot{O}(T)/\ddot{O}(0°\,C.))/K\_temp=(-1+(Vq/w-Id*Ld)/\ddot{O}(0°\,C.))/K\_temp$$

Embodiments of the invention may be implemented in a variety of applications. One example is a hybrid electric vehicle powertrain.

Figure 1:
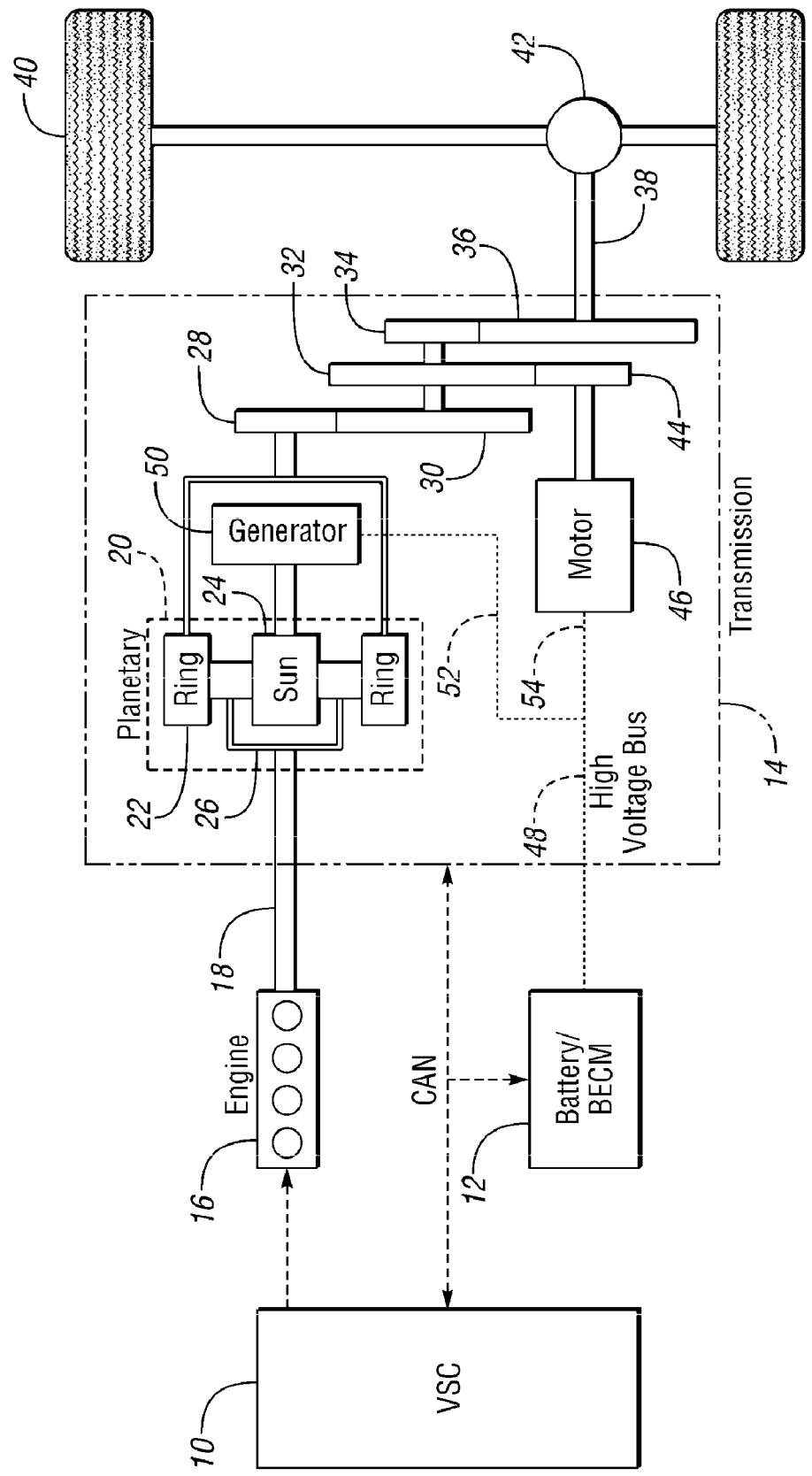
FIG. 1 is a schematic representation of a powersplit powertrain system configuration.

A hybrid electric vehicle powertrain is shown in FIG. 1. A vehicle system controller (VSC) 10, a battery and battery energy control module (BECM) 12, and a transmission 14, together with a motor-generator subsystem, comprise a control area network (CAN). An internal combustion engine 16, controlled by VSC 10, distributes torque through torque input shaft 18 to transmission 14.

The transmission 14 includes a planetary gear unit 20, which comprises a ring gear 22, a sun gear 24, and a planetary carrier assembly 26. The ring gear 22 distributes torque to step ratio gears comprising meshing gear elements 28, 30, 32, 34, and 36. A torque output shaft 38 for the transmission 14 is drivably connected to vehicle traction wheels 40 through a differential and axle mechanism 42.

Gears 30, 32, and 34 are mounted on a countershaft, with gear 32 engaging a motor-driven gear 44. Electric motor 46 drives gear 44, which acts as a torque input for the countershaft gearing.

The battery delivers electric power to the motor through power flow path 48, 54. Generator 50 is connected electrically to the battery and to the motor 46 in a known fashion as shown at 52.

The powersplit powertrain system of FIG. 1 may be operated in a variety of different modes as is appreciated by those skilled in the art. As shown, there are two power sources for the driveline. The first power source is a combination of the engine and generator subsystems, which are connected together using the planetary gear unit 20. The other power source involves the electric drive system including the motor 46, the generator 50, and the battery, where the battery acts as an energy storage medium for the generator 50 and the motor 46.

In general, VSC 10 calculates the total engine power needed to meet the drive wheel power demand plus all accessory loads, and independently schedules the engine speed and load operating point, with or without feedback of actual engine performance, to meet the total power demand. This type of approach is typically used to maximize fuel economy and may be used in other types of powertrain systems that have such VSCs.

Figure 2:
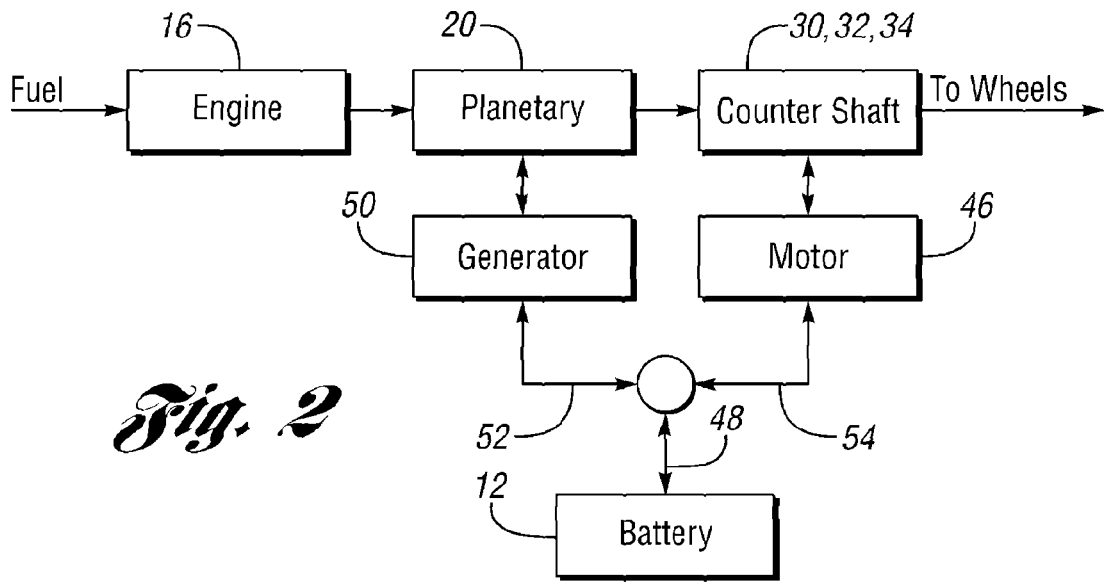
FIG. 2 is a schematic representation, in block diagram form, of a powertrain system power flow diagram.

The power flow paths between the various elements of the powersplit powertrain diagram shown in FIG. 1 are illustrated in FIG. 2. Fueling is scheduled based on driver and other inputs. Engine 16 delivers power to the planetary gear unit 20. The available engine brake power is reduced by accessory loads. Power is delivered by the planetary ring gear to the countershaft gears 30, 32, 34. Power output from the transmission drives the wheels.

Generator 50, when acting as a motor, can deliver power to the planetary gearing. When acting as a generator, generator 50 is driven by the planetary gearing. Similarly, power distribution between the motor 46 and the countershaft gears 30, 32, 34 can be distributed in either direction.

As shown in FIGS. 1 and 2, engine power output can be split into two paths by controlling generator 50. In operation, the system determines the driver's demand for torque and achieves the optimum split of power between the two power sources.

Figure 3:
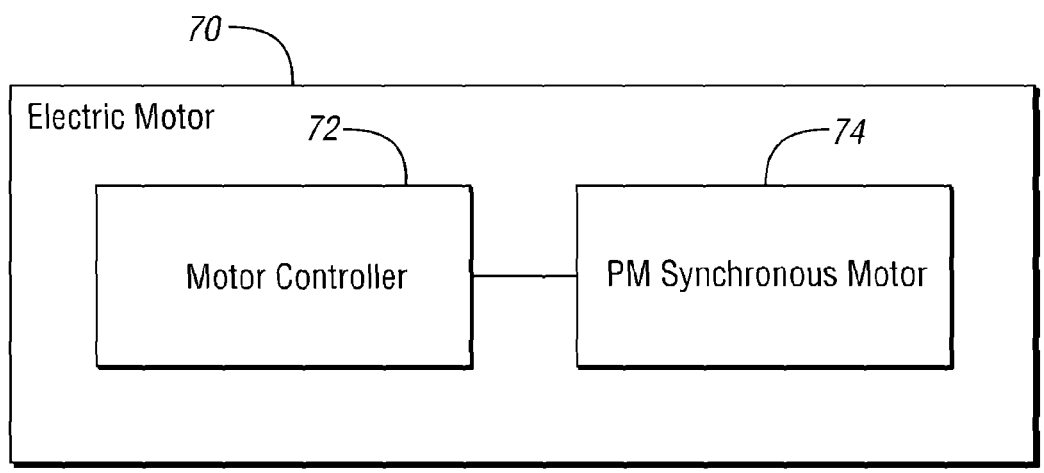
FIG. 3 illustrates an electric motor device, including a motor controller and a permanent magnet (PM) synchronous motor.

FIG. 3 illustrates an electric motor 70. Electric motor 70 includes motor controller 72 and permanent magnet (PM) synchronous motor 74. The temperature of the magnets in PM synchronous motor 74 may be estimated based on magnetic flux linkage in accordance with an embodiment of the invention. Embodiments of the invention are useful in hybrid vehicles that use PM synchronous motors. For example, motor 46 or generator 50 (FIGS. 1 and 2) may be implemented as a PM synchronous motor, and electric motor 70 may represent motor 46 or generator 50. Embodiments of the invention are also useful in other applications, and electric motor 70 may represent some other electric motor. Advantageously, embodiments of the invention may give the inside temperature of permanent magnets instead of surface temperature at the rotor end cap.

In general, electric motor 70, in this example, operates by providing a torque command to the motor controller 72 which controls PM synchronous motor 74 and attempts to provide the commanded torque output. Motor controller 72 may receive other inputs such as, for example, available voltage and current motor speed, as appreciated by those skilled in the art. It is understood by those skilled in the art that magnetic flux changes when temperature changes; accordingly, it is important to consider permanent magnet temperature in an electric machine. In accordance with embodiments of the invention, instead of sensing the surface temperature at the rotor end cap, an improved approach to magnet temperature estimation for permanent magnet (PM) electric machines based on magnetic flux linkage is provided.

Figures 4, 5:
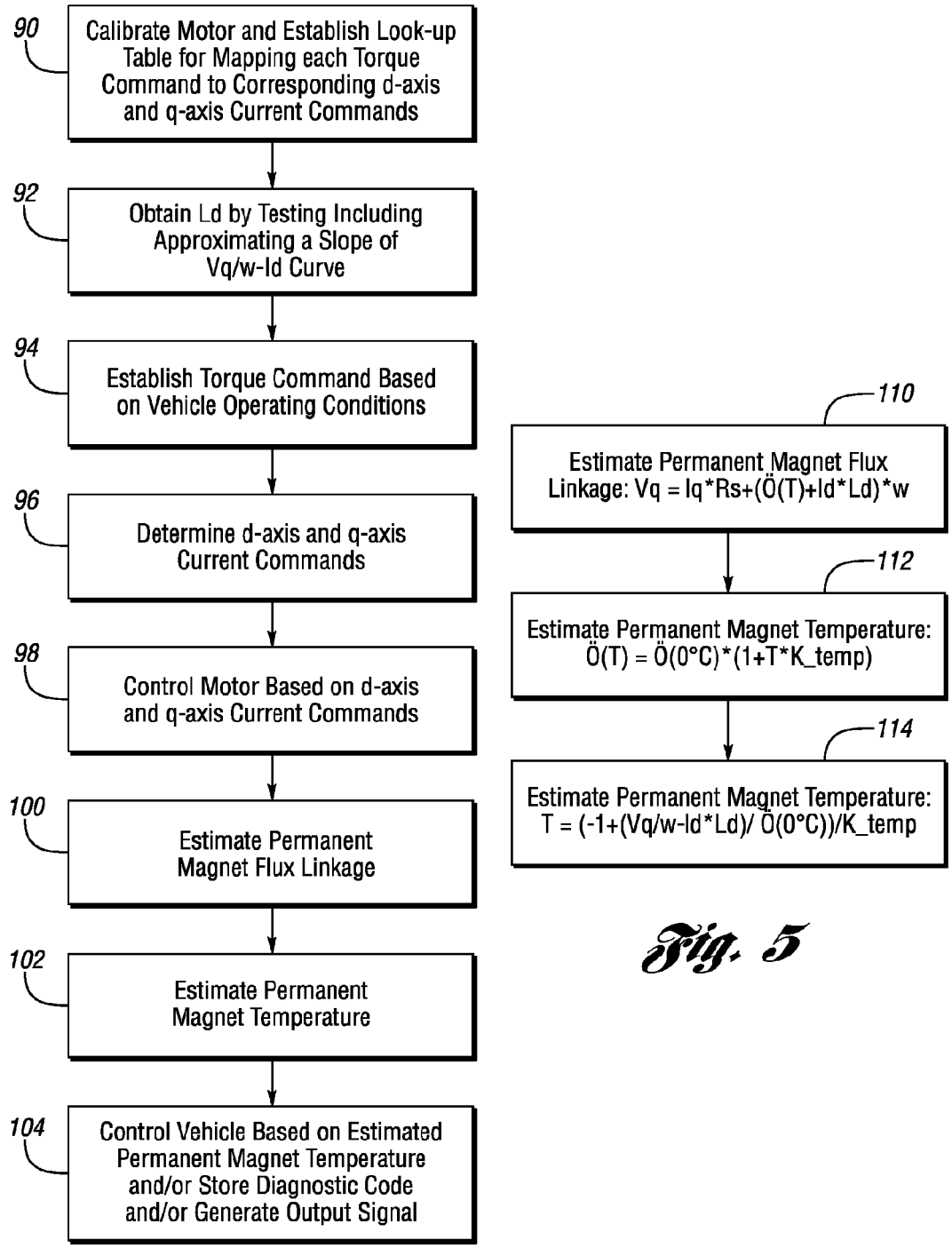
FIG. 4 illustrates a method of controlling a vehicle including a permanent magnet (PM) synchronous motor.
FIG. 5 illustrates further, more detailed aspects of controlling a permanent (PM) magnet synchronous motor.

FIG. 4 illustrates a method of controlling a vehicle including a permanent magnet (PM) synchronous motor, in an example embodiment. At block 90, the motor is calibrated and a look-up table is established for mapping each torque command to corresponding direct-axis (d-axis) and quadrature axis (q-axis) current commands. In more detail, the look-up table is used to determine the d-axis current command and the q-axis current command based on the torque command provided to the motor controller as understood by one of ordinary skill in the art. As well, the look-up table, in addition to torque command, may be further indexed by DC bus voltage and motor speed as understood by one of ordinary skill in the art.

As noted above and indicated at block 92, the motor Ld value is preferably obtained by testing. For example, the permanent magnet flux linkage may be estimated in accordance with $$Vq = Iq*Rs + (Ö(T) + Id*Ld)*w$$

wherein Ö(T) is permanent magnet flux linkage, Vq is q-axis voltage, Iq is q-axis current, Rs is stator resistance, Id is d-axis current, Ld is d-axis inductance, and w is electrical angular speed. Preferably, Ld is obtained by testing which includes commanding only Id current steps from zero to negative until Vq reaches zero, and approximating a slope of Vq/w–Id curve.

In operation of the electric motor, at block 94, a torque command is established based on vehicle operating conditions. At block 96, d-axis and q-axis current commands are determined for vector-based control of the PM synchronous motor. Of course, the torque to current commands mapping is one approach to obtaining the current command vector. Other approaches are possible as appreciated by one of ordinary skill in the art. In turn, at block 98, the motor is controlled based on direct-axis (d-axis) and quadrature-axis (q-axis) current commands.

At block 100, permanent magnet flux linkage is estimated based on q-axis voltage and electrical angular speed. At block 102, permanent magnet temperature is estimated based on permanent magnet flux linkage and the temperature coefficient of the permanent magnet. The method further comprises, as indicated at block 104, controlling the vehicle based on the estimated permanent magnet temperature. Controlling the vehicle may include one or more actions that are directed or affected by the estimated permanent magnet temperature. For example, controlling the vehicle may include generating an output signal indicative of the estimated permanent magnet temperature. For example, the vehicle may include a memory, and controlling the vehicle comprises storing a diagnostic code in the memory.

FIG. 5 illustrates further, more detailed aspects of controlling a permanent (PM) magnet synchronous motor. The permanent magnet flux linkage may be estimated, as indicated at block 110, in accordance with $$Vq = Iq*Rs + (Ö(T) + Id*Ld)*w$$

wherein Ö(T) is permanent magnet flux linkage, Vq is q-axis voltage, Iq is q-axis current, Rs is stator resistance, Id is d-axis current, Ld is d-axis inductance, and w is electrical angular speed.

The permanent magnet temperature may be estimated, as indicated at block 112, in accordance with $$Ö(T) = Ö(0° C.)*(1 + T*K\_temp)$$

wherein T is permanent magnet temperature, Ö(0° C.) is baseline flux linkage at 0° C., K_temp is the temperature coefficient of the permanent magnet in units of 1/° C.

And more particularly, the permanent magnet temperature may be estimated, as indicated at block 114, in accordance with $$T = (-1 + (Vq/w - Id*Ld)/Ö(0° C.))/K\_temp$$

wherein T is permanent magnet temperature, Vq is q-axis voltage, Id is d-axis current, Ld is d-axis inductance, w is electrical angular speed, Ö(0° C.) is baseline flux linkage at 0° C., and K_temp is the temperature coefficient of the permanent magnet in units of 1/° C.

It is to be appreciated by those skilled in the art that embodiments of the invention may be implemented in a variety of applications such as hybrid electric vehicles, motor test dynamometers, or other permanent magnet electric machines that use vector control.

Further, it is to be appreciated by those skilled in the art that embodiments of the invention include methods for controlling a vehicle or other system or apparatus including a permanent magnet (PM) synchronous motor, methods for controlling a PM synchronous motor, and apparatuses (for example, a motor controller) for controlling a PM synchronous motor.

It is to be appreciated that although equations discussed above use a baseline temperature of 0° C., equations using a different baseline temperature (such as 20° C. or a tunable parameter) are equivalent, as understood by those skilled in the art. For example, baseline flux linkage and baseline temperature may be given during development of the motor control. In another approach, baseline flux linkage and temperature are calculated at vehicle startup.

Further, it is appreciated that embodiments of the invention comprehend flexibility in the implementation. For example, a calibratable lookup table may be used to map voltage commands to magnet temperature. Further, other variations implementing the invention in accordance with the discussed equations are possible. In another example, compensation for dead-time and other nonlinear effects may be needed.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed:

1. A method of controlling a vehicle including a permanent magnet (PM) synchronous motor, the motor being controlled based on direct-axis (d-axis) and quadrature-axis (q-axis) current commands, the method comprising:
    estimating permanent magnet flux linkage based on q-axis voltage and electrical angular speed;
    estimating permanent magnet temperature based on permanent magnet flux linkage and the temperature coefficient of the permanent magnet; and
    controlling the vehicle based on the estimated permanent magnet temperature.

2. The method of claim 1 wherein permanent magnet flux linkage is estimated in accordance with $$Vq = Iq*Rs + (Ö(T) + Id*Ld)*w$$

wherein Ö(T) is permanent magnet flux linkage, Vq is q-axis voltage, Iq is q-axis current, Rs is stator resistance, Id is d-axis current, Ld is d-axis inductance, and w is electrical angular speed.

3. The method of claim 1 wherein permanent magnet temperature is estimated in accordance with $$Ö(T)=Ö(0°\,C.)*(1+T*K\_temp)$$

wherein T is permanent magnet temperature, Ö(0° C.) is baseline flux linkage at 0° C., K_temp is the temperature coefficient of the permanent magnet in units of 1/° C.

4. The method of claim 1 wherein permanent magnet temperature is estimated in accordance with $$T=(-1+(Vq/w-Id*Ld)/Ö(0°\,C.))/K\_temp$$

wherein T is permanent magnet temperature, Vq is q-axis voltage, Id is d-axis current, Ld is d-axis inductance, w is electrical angular speed, Ö(0° C.) is baseline flux linkage at 0° C., and K_temp is the temperature coefficient of the permanent magnet in units of 1/° C.

5. The method of claim 1 wherein permanent magnet flux linkage is estimated in accordance with $$Vq=Iq*Rs+(Ö(T)+Id*Ld)*w$$

wherein Ö(T) is permanent magnet flux linkage, Vq is q-axis voltage, Iq is q-axis current, Rs is stator resistance, Id is d-axis current, Ld is d-axis inductance, and w is electrical angular speed; and
  wherein Ld is obtained by testing which includes commanding only Id current steps from zero to negative until Vq reaches zero, and approximating a slope of Vq/w−Id curve.

6. The method of claim 1 wherein controlling the vehicle comprises:
  generating an output signal indicative of the estimated permanent magnet temperature.

7. The method of claim 1 wherein the vehicle includes a memory, and wherein controlling the vehicle comprises storing a diagnostic code in the memory.

8. A method of controlling a permanent magnet (PM) synchronous motor, the motor being controlled based on direct-axis (d-axis) and quadrature-axis (q-axis) current commands, the method comprising:
  estimating permanent magnet flux linkage based on q-axis voltage and electrical angular speed;
  estimating permanent magnet temperature based on permanent magnet flux linkage and the temperature coefficient of the permanent magnet; and
  generating an output signal indicative of the estimated permanent magnet temperature.

9. The method of claim 8 wherein permanent magnet flux linkage is estimated in accordance with $$Vq=Iq*Rs+(Ö(T)+Id*Ld)*w$$

wherein Ö(T) is permanent magnet flux linkage, Vq is q-axis voltage, Iq is q-axis current, Rs is stator resistance, Id is d-axis current, Ld is d-axis inductance, and w is electrical angular speed.

10. The method of claim 8 wherein permanent magnet temperature is estimated in accordance with $$Ö(T)=Ö(0°\,C.)*(1+T*K\_temp)$$

wherein T is permanent magnet temperature, Ö(0° C.) is baseline flux linkage at 0° C., K_temp is the temperature coefficient of the permanent magnet in units of 1/° C.

11. The method of claim 8 wherein permanent magnet temperature is estimated in accordance with $$T=(-1+(Vq/w-Id*Ld)/Ö(0°\,C.))/K\_temp$$

wherein T is permanent magnet temperature, Vq is q-axis voltage, Id is d-axis current, Ld is d-axis inductance, w is electrical angular speed, Ö(0° C.) is baseline flux linkage at 0° C., and K_temp is the temperature coefficient of the permanent magnet in units of 1/° C.

12. The method of claim 8 wherein permanent magnet flux linkage is estimated in accordance with $$Vq=Iq*Rs+(Ö(T)+Id*Ld)*w$$

wherein Ö(T) is permanent magnet flux linkage, Vq is q-axis voltage, Iq is q-axis current, Rs is stator resistance, Id is d-axis current, Ld is d-axis inductance, and w is electrical angular speed; and
  wherein Ld is obtained by testing which includes commanding only Id current steps from zero to negative until Vq reaches zero, and approximating a slope of Vq/w−Id curve.

13. An apparatus for controlling a permanent magnet (PM) synchronous motor, the apparatus comprising:
  a motor controller configured to:
    control the motor based on direct-axis (d-axis) and quadrature-axis (q-axis) current commands;
    estimate permanent magnet flux linkage based on q-axis voltage and electrical angular speed;
    estimate permanent magnet temperature based on permanent magnet flux linkage and the temperature coefficient of the permanent magnet; and
    generate an output signal indicative of the estimated permanent magnet temperature.

14. The apparatus of claim 13 wherein permanent magnet flux linkage is estimated in accordance with $$Vq=Iq*Rs+(Ö(T)+Id*Ld)*w$$

wherein Ö(T) is permanent magnet flux linkage, Vq is q-axis voltage, Iq is q-axis current, Rs is stator resistance, Id is d-axis current, Ld is d-axis inductance, and w is electrical angular speed.

15. The apparatus of claim 13 wherein permanent magnet temperature is estimated in accordance with $$Ö(T)=Ö(0°\,C.)*(1+T*K\_temp)$$

wherein T is permanent magnet temperature, Ö(0° C.) is baseline flux linkage at 0° C., K_temp is the temperature coefficient of the permanent magnet in units of 1/° C.

16. The apparatus of claim 13 wherein permanent magnet temperature is estimated in accordance with $$T=(-1+(Vq/w-Id*Ld)/Ö(0°\,C.))/K\_temp$$

wherein T is permanent magnet temperature, Vq is q-axis voltage, Id is d-axis current, Ld is d-axis inductance, w is electrical angular speed, Ö(0° C.) is baseline flux linkage at 0° C., and K_temp is the temperature coefficient of the permanent magnet in units of 1/° C.

17. The apparatus of claim 13 wherein permanent magnet flux linkage is estimated in accordance with $$Vq=Iq*Rs+(Ö(T)+Id*Ld)*w$$

wherein Ö(T) is permanent magnet flux linkage, Vq is q-axis voltage, Iq is q-axis current, Rs is stator resistance, Id is d-axis current, Ld is d-axis inductance, and w is electrical angular speed; and
  wherein Ld is obtained by testing which includes commanding only Id current steps from zero to negative until Vq reaches zero, and approximating a slope of Vq/w−Id curve.

* * * * *